Figure 1:
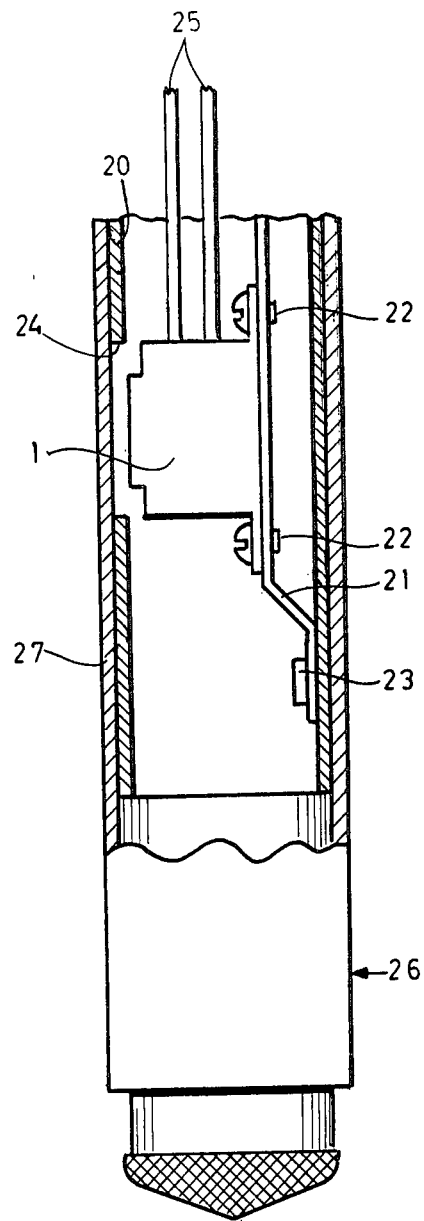

United States Patent [19]

Hägglund

[11] 4,354,382
[45] Oct. 19, 1982

[54] DEVICE FOR DETERMINING THE LEVEL OF MELT IN A LADLE OR THE LIKE

[75] Inventor: Hans Hägglund, Örsundsbro, Sweden

[73] Assignee: AB Rescon, Sweden

[21] Appl. No.: 158,296

[22] Filed: Jun. 10, 1980

[30] Foreign Application Priority Data

Jun. 11, 1979 [SE] Sweden .................................. 790576
Sep. 20, 1979 [SE] Sweden ................................ 7907816

[51] Int. Cl.³ ............................................. G01F 23/26
[52] U.S. Cl. ............................ 73/290 R; 33/126.4 R; 73/304 R; 340/618
[58] Field of Search ........... 33/126, 126.4 R, 126.4 A, 33/126.7 R, 126.7 A, 126.6; 340/615, 618, 620; 73/290 B, 304 C, 290 R, DIG. 9, 304 R, 864.53; 324/59, 61 P

[56] References Cited

U.S. PATENT DOCUMENTS

| | | | |
|---|---|---|---|
| 2,354,964 | 8/1944 | Osterman | 73/304 C |
| 2,648,058 | 8/1953 | Breedlove | 340/618 |
| 3,395,908 | 8/1968 | Woodcock | 73/304 |
| 3,552,214 | 1/1971 | Collins | 73/DIG. 9 |
| 3,685,359 | 8/1972 | Boron | 73/DIG. 9 |
| 3,693,449 | 9/1972 | Collins | 73/DIG. 9 |
| 3,805,621 | 4/1974 | Falk | 73/DIG. 9 |
| 3,942,105 | 3/1976 | Bondarenko | 340/618 |
| 4,002,069 | 1/1977 | Takemura | 73/DIG. 9 |
| 4,025,846 | 5/1977 | Franz | 324/61 P |

FOREIGN PATENT DOCUMENTS 160355 1/1964 U.S.S.R. ............................. 324/61 P

Primary Examiner—Anthony V. Ciarlante
Assistant Examiner—Denis E. Corr
Attorney, Agent, or Firm—Witherspoon & Hargest

[57] ABSTRACT

The present invention relates to a device for determining the level of the melt in a ladle or the like, which device comprises a lance (20) with a tubular end adapted to be submerged in the melt. At least one non-contact sensor (1) is mounted in the tubular end of the lance (20) straight opposite to an aperture (24) through the wall of the tubular end. The aperture (24) or the apertures are covered by a sleeve (27) of a heat resistant, electricly non-conducting material. The sensor or the sensors are electrically connected to operational equipment for signals coming from the sensor or the sensors.

3 Claims, 2 Drawing Figures

DEVICE FOR DETERMINING THE LEVEL OF MELT IN A LADLE OR THE LIKE

The present invention relates to a device for determining the level of the melt in a ladle or the like.

There are several reasons why it is necessary to know as exactly as possible the level of the melt in a ladle. One reason is that when samples are to be drawn from the melt it is necessary to know that the sampler is positioned sufficiently deep down in the melt for the sample to be representative. Another reason is than when oxygen gas is to be blown over the melt for reducing the same the oxygen gas is to be blown out at a certain height above the surface of the melt for achieving the best effect.

By the oxygen gas blowing the distance between the opening of the oxygen gas lance and the surface of the melt, i.a. the surface of the metal under the slag layer, must in reality not vary more than a few centimeters. Up to now there has however not existed any quite feasible method for the determination of the level of the melt with an acceptable accuracy and for that reason it has been necessary to allow derivations of up to about 50 centimeters. This has led to variations in the composition of the melt which have been necessary to compensate in suitable ways. This has in turn led to an unnecessary extension of the dwell time in the chill mold and resulting additional costs.

The invention will be described below in connection with a sampling lance but to a man skilled in the art it will be obvious how the signal from the sensor can be used for several other purposes. Thus the signal obtained by the sampling can be used for determining how far the oxygen lance is to be brought down towards the melt for the oxygen gas blowing, bu it is also possible to use a separate level indicator for the sampling as well as for the oxygen gas blowing.

In the illustrated embodiment an inductive sensor is used. For certain applications a capacitive sensor can be preferable. In certain applications it can also be suitable to use two sensors placed in sequence, e.g. if it is suspected that the slag layer is so rich in metal that a signal can be received therefrom. The difference in signal intensity from the two sensors does in that case give a clear indication of where the level of the melt lies.

A lot of problems exist in connection with the drawing of samples from molten metal, and especially from the molten metal in a ladle. Among these there is the problem of somehow making sure that the sampler has reached a position sufficiently deep down in the melt so that a representative sample is obtained when this is drawn and that the sampler is maintained in the melt during a time that is long enough for the sample to fill up the sampler mold but not long enough for the mold to be heated to such a degree that the sample does not solidify therein but flows out therefrom when the sampler is lifted.

Similar problems also exist in connection with determining the level to which other equipment, e.g. metering devices for determining oxygen-activity and temperature in melt, is to be lowered towards or into the melt and for determining the time during which such equipment is to be submerged.

On the surface of a melt there is always floating a layer of slag and other contaminants, which the sampler has to penetrate without being influenced. Below this layer there follows a relatively thin zone of extremly hot melt and below this lays the part of the melt from which it is normally desirable to draw samples.

There does not exist many well known samplers both of the disposable type and of the multiple-use-type, which in certain cases, if slightly modified, can be used in connection with the lance according to the present invention. Thus the sampler in itself does not constitute any part of the present invention. Other equipment which may be used for the lowering down towards or into melt by means of a device according to the present invention do not constitute any part of the present invention either.

Normally a lance in the shape of a straight or bent steel tube having the sampler mounted to one of its ends is used for bringing the sampler into the melt. The sampler is manually or by means of a lifting device, lowered down into the melt to a position therein which is judged by the man carrying out the sampling to be satisfactory for obtaining a representative sample of the melt. In this connection it is important to maintain the sampler in the melt long enough for the mold to be filled and for the sample to solidify sifficiently for remaining therein. If the sampler is maintained too long the melt the semper is heated to such an extent that the sample flows out of the mold when the sampler is lifted.

Since it is practically impossible to determine the thickness of the slag layer and thus to determine at which level in the ladle the surface of the melt lays it has often been very difficult to obtain representative samples. One attemt has been made to solve this problem by using thermoelements in connection with the sampler. The idea was that the hot zone below the slag layer should give a clear indication of the level of the melt. This attemt has however not been successful, primarily since deposits have stuck to the thermoelement and caused incorrect indications. So far no method has been discovered for solving the problem with the deposits.

The object of the present invention is to overcome the above mentioned problem. This object is achieved by means of a device of the kind indicated in the claims, from which the characteristic features of the invention are also clear.

Figure 2:
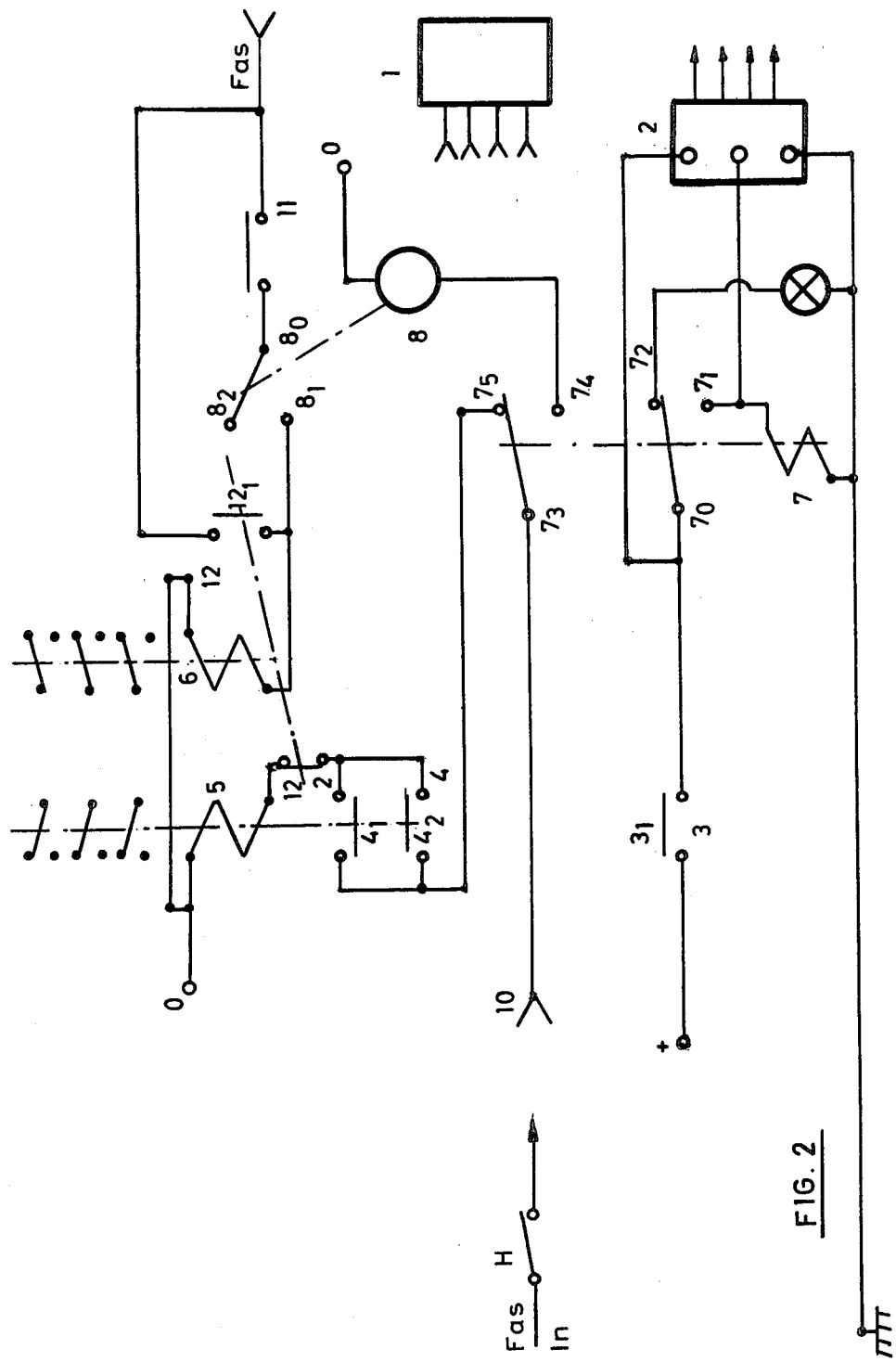

The invention is described more closely below in connection with the enclosed drawings in which FIG. 1 is a part-sectional view through the end of the lance according to the invention carrying the sampler or other equipment, and FIG. 2 is a circuit diagram for the electrical circuit for a sampling device comprising a lance according to the invention.

In the illustrated embodiment of the invention a non-contact inductive sensor 1 is positioned in a lance 20, made up of a steel tube, adjacent the end of the lance 20 carrying the sampler. The sensor 1 is mounted on a bar 21 by means of e.g. screws 22. The bar 21 is bent in such a way that the sensor 1 is held in the desired position in the lance tube 20, and at its ends it is fastened to the lance tube 20, e.g. by means of rivets 23. The attachment must however be such that the outer surface of the lance 20 remains smooth.

The sensor 1 is positioned straight opposite an aperture 24 in the lance tube 20. This aperture is wide enough for making sure that the sensor 1 will not be influences by the metal in the lance tube 20.

Preferably the sensor 1 is adjustable in a radial direction so that it can occupy positions at different distances from the aperture 24 in the lance tube. In this way its sensibility can be varied in a simple way since its actuating lobe extends unequally far from the lance depending on the adjustment. This adjustment can be accomplished by means of the screws 22.

The sensibility of the sensor 1 can also be varied electrically. In certain situations there may also be reasons for reducing the sensibility if the slag on the melt contains such an amount of metal that this influences the sensor.

A number of electrical conductors 25 project from the sensor and are suitably connected to the equipment that will be described below.

In use the sampler 26 with the tubular sleeve 27 is positioned over the end of the lance 20. The sleeve 27 is preferably manufactured from paper material and consists of several layers that are bound together by a suitable binder, e.g. silikate of zoda or resin, and has a thickness of between 10 and 15 mm. The thickness can vary depending upon the different applications and the given values are only the ones most commonly used.

The sleeve 27 has a length such that it covers the aperture 24 with a good margin and the sampler 26 is constructed such that it, when mounted correctly on the lance 20 positions the mold therein in a predetermined relation to the sensor 1.

The material in the sleeve 27 is electrically non-conducting in order not to influence the sensor 1. The material is also such that molten metal does not adhere thereto and besides paper the material can consist of e.g. ceramic fibre material or the like. the paper material functions such that when it is lowered down into the melt there is pincipally a boiling occuring in the material of the sleeve and this boiling is most likely the effect that keeps deposits from sticking to the sleeve.

The sensor 1 is provided with an actuating lobe projecting substantially transversally from the lance 20. This means that when the sampler 26 is lowered down into the melt this will be actuated by the molten metal and the sensor will give the desired signal. It has been found that the sensor very seldomly is influences by the slag layer.

The mode of operation for the invention is clear from the following description of the electrical equipment. It should however be understood that this may have many different designs and that the described design only gives an example of one suitable design.

Irrespectively of if the sampler is of a disposably type or of a multiple-use type or if any other equipment is used, a man skilled in the art will realize that the basic novelty in this invention lays in the fact that a non-contact sensor may be used, and this has been achieved due to the fact that the sensor is protected in the lance proper. The aperture in the lance which is necessary for actuating the sensor has been successfully protected by means of a sleeve and it is surprising that such a sleeve may constitute a sufficient protection without affecting the detecting ability of the sensor in a negative way. For that reason the equipment and the cover for the sensor may very well be separated without affecting the inventive consept in itself.

The lamp "ready for sampling" is lit hen the "shutter- or gate contact" 3 is closed and a potential of 24 V is simultaneously applied to the amplifier unit 2 for the non-contact inductive sensor 1.

The signal from the non-contact inductive sensor 1 is supposed to be 24 V when the sensor is detecting the melt and 0 V when the sensor is not detecting the melt.

The start button 4 is pushed to activate the relay 5 for self-holding the contact groups of the relay in order to connect a driving motor for lowering the sampler.

The relay 5 is energized from a phase 10 through a contact arm 72 resting against the contact 75.

When the inductive sensor 1 has reached down into the melt a voltage level of 24 V is obtained on the connection 71 which causes the relay 7 to switch to self-holding. At the same time the lamp "ready for sampling" goes out. When the non-contact sensor 1 detects the melt the relay 7 is activated and cuts off the current to the coil in the relay 5 by switching the relay contact 73 from the position 75 to the position 74. The self-holding of the relay 5 ceases. Through the switching of the contact arm 73 to the position 74 a supply voltages is applied to the timer 78 which is triggered by this supply voltages. After a predetermined time the contact 80 in the timer is closed whereby the motor relay 6 is activated for switching the drive motor to the "up"-position for raising the sampler from the melt. A limit switch 11 is provided for limiting the upward movement. An emergency raising contact 12 is provided for by-passing the contact 80 in the timer in case there appears a fault in the sampler so that it has to be removed from the melt before the contact 80 in the timer has been activated. The contact bow 121 in the emergency raising contact 12 activates the relay 6 for raising at the same time as the contact bow 121 disconnects the current to the "down"-relay 5.

When the sampler has been removed from the melt the potential on the connection 71 is switched from 24 V to 0 V. An opening of the gate-contact 3 abrogates the self-holding of the relay 7, whereby the lamp "ready for sampling" is lit and the timer 8 is reset, which means that a new sampling-sequence can be carried out.

In a device according to the present invention two sensors may be placed in sequence in the lance. By comparing the signals from the two sensors by the submerging in the melt it is also possible to obtain an indication of the thickness of the slag layer. In that case the adjustment of the two sensors is such that a weak signal is received from the slag and that a strong signal is received from the melt proper.

Although the invention has been described with respect to a sampler where the level of the melt has been used for determining the depth to which the sampler has been submerged in the melt it is quite obvious that the signal for the level of the melt or for the level of the slag may be used for other control purposes, e.g. for determining the position for an oxygen gas lance above the melt.

I claim:

1. Device for determining the level of a melt in a ladle or the like comprising,
    a lance, one end of which comprises a tubular wall portion which is adapted to be submerged into said melt, the surface of said wall portion having at least one aperture therethrough;
    at least one non-contact sensor mounted internal of said lance upon the surface of said wall portion, each sensor being positioned opposite an aperture;
    means attached to each sensor for electrical connection to equipment which receives signals coming from each sensor; and,
    a sleeve of heat resistant, electrically non-conducting material which encloses said tubular wall portion and covers each aperture.

2. Device according to claim 1 characterized in that the sensor or the sensors are non-contact inductive sensors.

3. Device according to claim 1 or 2, characterized in that the sleeve (27) consists of paper material.

* * * * *